C. W. BAIRD.
HAY RACK.
APPLICATION FILED AUG. 14, 1908.
927,019.
Patented July 6, 1909.
2 SHEETS—SHEET 1.
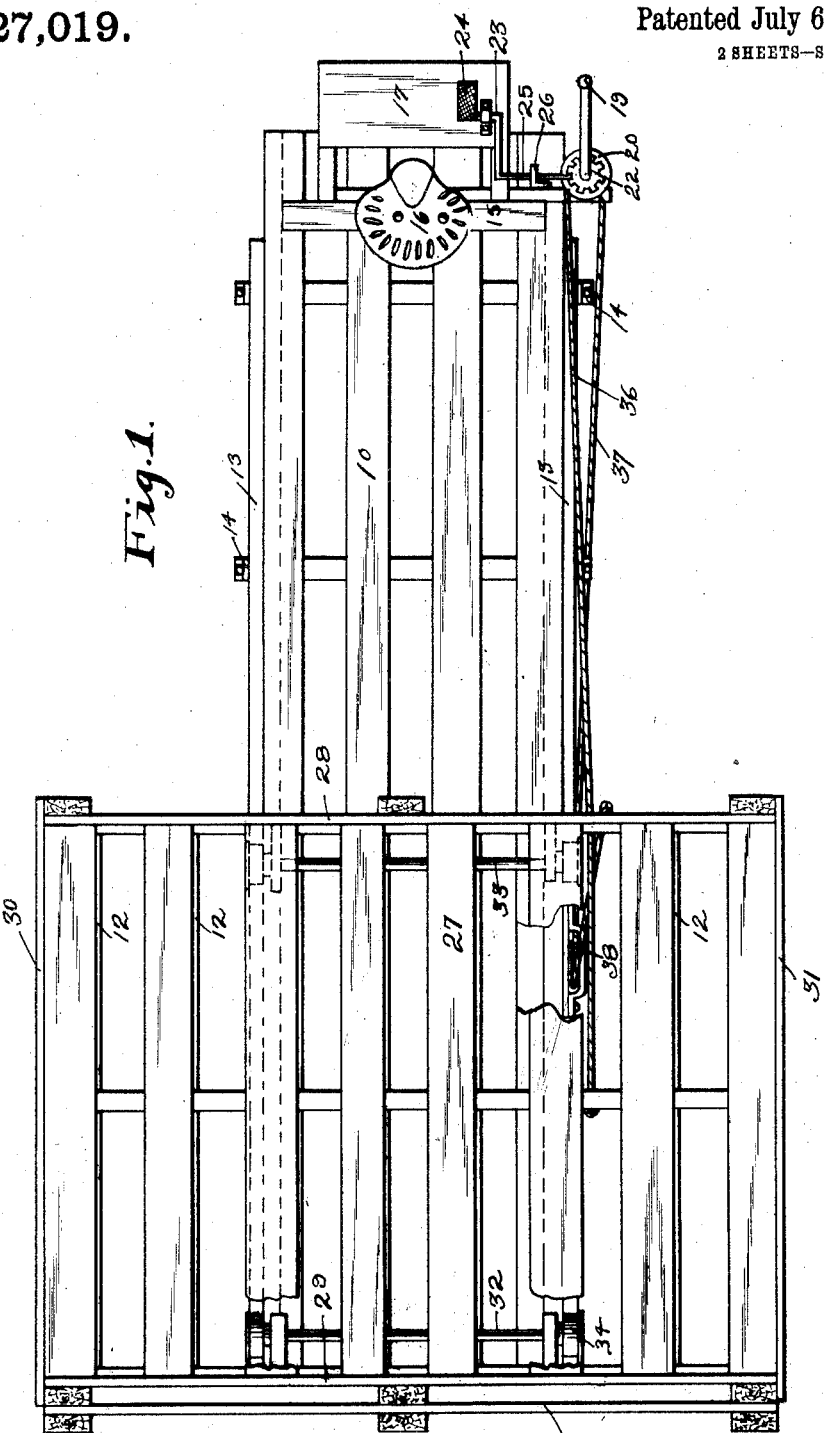
Witnesses
F. C. Caswell
F. C. Dahlberg
Inventor
C. W. Baird.
by Orwig & Lane Attys C. W. BAIRD.
HAY RACK.
APPLICATION FILED AUG. 14, 1908.
927,019.
Patented July 6, 1909.
2 SHEETS—SHEET 2.
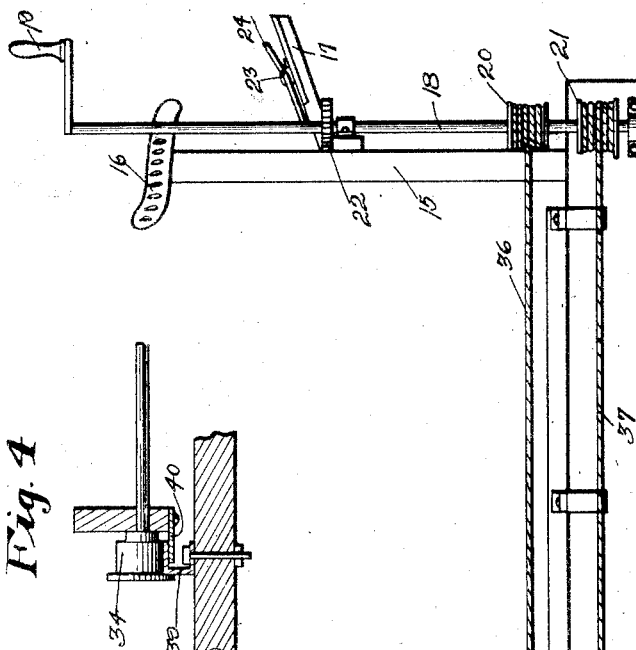
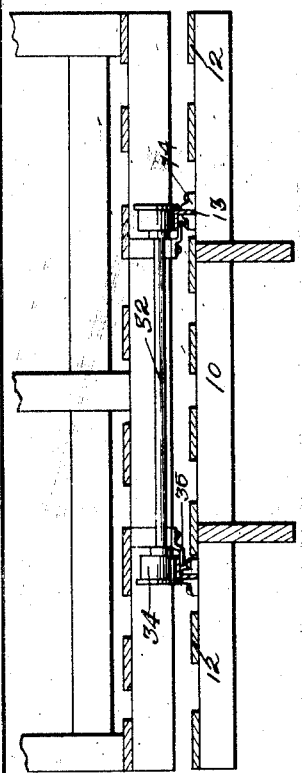
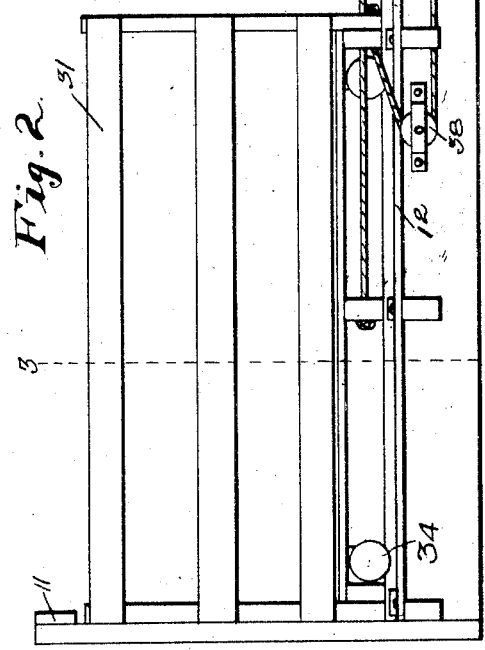
Witnesses
F. C. Caswell
F. C. Dahlberg.
Inventor
C. W. Baird
by Orwig & Lane Attys.

UNITED STATES PATENT OFFICE.

CHARLES W. BAIRD, OF DEEP RIVER, IOWA.

HAY-RACK.

No. 927,019.    Specification of Letters Patent.    Patented July 6, 1909.

Application filed August 14, 1908. Serial No. 448,516.

*To all whom it may concern:*

Be it known that I, CHARLES W. BAIRD, a citizen of the United States, residing at Deep River, in the county of Poweshiek and State of Iowa, have invented a certain new and useful Hay-Rack, of which the following is a specification.

My invention relates to that class of hay racks in which the body of the hay rack is provided with a sliding hay rack member of about half the length of the hay rack proper and so arranged that it may first be positioned at the rear of the hay rack member to receive hay from a loader attached to the rear of the wagon, and then after said movable rack member is filled it may bodily move to the forward end of the rack, so that the rear end may then be filled with hay from the loader to thereby avoid the necessity of having an operator move the hay from the rear end of the wagon to the front end by hand.

This invention belongs to the same class of hay racks as that illustrated in United States Letters Patent, number 850,285, issued to me on the sixteenth day of April, 1907.

The object of my invention is to provide a hay rack of this class in which a driver seated on the driver's seat at the front of the machine may readily, quickly and easily move the movable hay rack member either forwardly or rearwardly as desired, and may firmly secure it in any position of its adjustment so that the movable member will not slide on the hay rack member when the wagon is going up or down hill, and a further object is to provide a device of this kind so arranged that when the movable hay rack member is at its forward limit, the operating ropes and pulleys, etc., will be contained under it and protected by it, so that the hay subsequently loaded upon the rear end of the rack will not in any way interfere with the operating ropes and pulleys.

A further object is to provide improved means, of simple, durable and inexpensive construction, for slidingly mounting the movable member upon the hay rack proper and for preventing tilting movements of the movable hay rack member.

My invention consists in the construction, arrangement and combination of the various parts of the device whereby the objects contemplated are attained, as hereinafter more fully set forth, pointed out in my claims and illustrated in the accompanying drawings, in which—

Figure 1 shows a top or plan view of a hay rack embodying my invention. Fig. 2 shows a side elevation of same. Fig. 3 shows a transverse, sectional view on the line 3—3 of Fig. 2 to illustrate the rolling support of the movable rack member, and—Fig. 4 shows an enlarged, detail sectional view illustrating a modified form of the rolling support.

Referring to the accompanying drawings, I have used the reference numeral 10 to indicate the body portion of the hay rack proper. At its rear end is an upright frame 11 and at the rear portion of its sides is an extension frame 12. These frame members 12 extend laterally from the rear portion of the hay rack body, as clearly shown in Fig. 3. Mounted on top of the hay rack proper are two track rails, each comprising an angle bar 13 with one edge extended downwardly and into a bracket 14 which is fixed to the hay rack proper, and the other portion of each angle bar being extended inwardly, as clearly shown in Fig. 3.

At the front of the hay rack proper is an upright 15 having a driver's seat 16 thereon, and also having a foot rest 17. Mounted on the upright 15 adjacent to the driver's seat is a vertical shaft 18 having a crank 19 at its top. At the lower end of the shaft 18 are two drums 20 and 21 and near the central portion of the shaft 18 is a notched wheel 22. Arranged on the foot platform 17 is a rock shaft 23 having on one end a foot lever 24 and on its other end an arm 25 mounted in a slotted guide 26 and arranged in position for normally entering one of the notches in the wheel 22. Said arm may be raised out of said notch when the operator presses downwardly upon the foot lever 24.

The movable hay rack member comprises a base platform 27, front and rear upright frame members 28 and 29, and upright side members 30 and 31. The width of said movable hay rack member is substantially the same as that of the stationary one and its length is approximately half that of the hay rack body portion. Mounted in the lower portion of the movable hay rack member are two axles 32 and 33, each having flanged wheels 34 on its ends, the latter being designed to rest upon the horizontal portions of the angle bar track pieces 13 with the flanges thereof on the outside of said tracks. In order to prevent tilting movements of the movable hay rack member, I provide a number of short arms 35 fixed to the movable hay rack member and extended under the horizontal portions of the angle bars that form the track as clearly shown in Fig. 3.

In order to move the movable hay rack member forwardly, I provide a rope or cable 36 fixed to and wound upon the drum 20 and attached to the central portion of the movable hay rack member below its bottom platform. In order to move the movable hay rack member rearwardly, I provide a rope or cable 37 fixed to and wound upon the drum 21 and extended rearwardly to a point a slight distance in the rear of the center of the hay rack body portion where it passes under a pulley 38, and then forwardly where it is attached to the forward edge of the movable hay rack member. These ropes or cables 36 and 37 are wound upon their respective drums in opposite directions so that when one is being wound up the other unwinds, hence, by turning the crank 19 in one direction the movable hay rack member is moved forwardly and when the crank is turned in the opposite direction, it is moved rearwardly. Furthermore, the movable hay rack member will be firmly held when at any position of its movement by holding the crank 19 stationary, and this can be done by means of the foot actuated device for engaging the notched wheel 22.

In the modified form shown in Fig. 4, I have illustrated a track rail comprising a structural metal bar 39, U-shaped in cross section, one of the sides of which is bolted to the hay rack body portion and the other is designed to receive the flanged wheel 34. A flat plate 40 is attached to a part of the movable hay rack member and projects under the upper horizontal portion of the track 39 to thereby prevent tilting movements of the movable hay rack member.

In practical use hay is first loaded in the movable hay rack at the rear of the wagon. Obviously, when in this position none of the ropes or pulleys are in position to be engaged by or entangled with the hay. When the movable hay rack is full, the operator places his foot upon the lever 24, and then turns the crank 19 in the proper direction. In this way the movable hay rack member is moved to the front of the machine and the rear of the hay rack body portion is ready to receive a load of hay. By having the pulleys and ropes arranged as set forth herein, hay may be loaded upon the rear of the hay rack body portion and will not interfere with or become entangled in said ropes or pulleys. Furthermore, the movable hay rack is locked and held in any position in which it is placed on account of the gravity pawl device engaging the notched wheel 22.

I claim as my invention.

1. The combination with a hay rack body portion of a movable hay rack member slidingly mounted upon the hay rack body portion, a shaft at the forward end of the hay rack body portion, two ropes fixed thereto and wound thereon in opposite directions, one rope being attached to the movable hay rack member direct, and the other being attached to the movable hay rack member and then extended rearwardly, and a pulley fixed to the hay rack body portion, and having said latter rope passed in the rear of it, and means for turning said shaft.

2. The combination with a hay rack body portion of a movable hay rack member slidingly mounted upon the hay rack body portion, a shaft at the forward end of the hay rack body portion, two ropes fixed thereto and wound thereon in opposite directions, one rope being attached to the movable hay rack member direct, and the other being attached to the movable hay rack member and then extended rearwardly, and a pulley fixed to the hay rack body portion, and having said latter rope passed in the rear of it, and means for turning said shaft, and means for locking said shaft against rotation in either direction.

3. The combination with a hay rack body portion of a movable hay rack member slidingly mounted upon the hay rack body portion, a shaft at the forward end of the hay rack body portion, two ropes fixed thereto and wound thereon in opposite directions, one rope being attached to the movable hay rack member direct, and the other being attached to the movable hay rack member and then extended rearwardly, and a pulley fixed to the hay rack body portion, and having said latter rope passed in the rear of it, means for turning said shaft, and means for locking said shaft against rotation in either direction, said means comprising a notched wheel fixed to the shaft, a foot lever having an arm connected therewith and designed to enter one of the notches in the wheel when released.

4. An improved hay rack, comprising a hay rack body portion having extension side frames at its rear, track rails extended longitudinally of the body portion, a movable hay rack member, supporting wheels therefor mounted upon said track, a vertical shaft mounted at the forward portion of the hay rack body adjacent to one side thereof, a pulley fixed to one side of the hay rack body portion slightly in the rear of the center thereof, two drums fixed to said shaft, two ropes or cables fixed to and wound upon said drums in opposite directions, one being attached direct to the movable hay rack member, the other being passed under said pulley and then forwardly and attached to the movable hay rack member, and means for rotating said shaft.

5. An improved hay rack, comprising a hay rack body portion, two structural metal track members arranged longitudinally of the hay rack body portion, each having an inwardly extended flange at its top, a movable hay rack member, two axles therefor, flanged wheels on the axles, the flanges thereof being arranged to stand outside of said track members, and arms fixed to the movable hay rack member and extended outwardly under the top flanges of said track members to prevent tilting movements of the movable hay rack member.

Des Moines, Iowa, Aug. 1, 1908.

CHARLES W. BAIRD.

Witnesses:
 N. M. TAYLOR,
 M. B. GOLDIZEN.